(12) United States Patent
Bieswanger et al.

(10) Patent No.: US 7,908,493 B2
(45) Date of Patent: Mar. 15, 2011

(54) UNIFIED MANAGEMENT OF POWER, PERFORMANCE, AND THERMALS IN COMPUTER SYSTEMS

(75) Inventors: Andreas Bieswanger, Ehningen (DE); Michael S. Floyd, Cedar Park, TX (US); Soraya Ghiasi, Austin, TX (US); Steven P. Hartman, Round Rock, TX (US); Thomas W. Keller, Jr., Austin, TX (US); Hye-Young McCreary, Liberty Hill, TX (US); Karthick Rajamani, Austin, TX (US); Freeman L. Rawson, III, Austin, TX (US); Juan C. Rubio, Austin, TX (US); Malcolm S. Ware, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 630 days.

(21) Appl. No.: 11/758,798

(22) Filed: Jun. 6, 2007

(65) Prior Publication Data

US 2008/0307238 A1    Dec. 11, 2008

(51) Int. Cl.
*G06F 1/32* (2006.01)
(52) U.S. Cl. ........................................ 713/300; 310/320
(58) Field of Classification Search .................. 713/300, 713/310, 320
See application file for complete search history.

(56) References Cited

U.S. PATENT DOCUMENTS

| | | | |
|---|---|---|---|
| 5,557,548 A | 9/1996 | Gover et al. | |
| 5,657,253 A | 8/1997 | Dreyer et al. | |
| 5,719,800 A | 2/1998 | Mittal et al. | |
| 5,796,637 A | 8/1998 | Glew et al. | |
| 5,832,284 A | 11/1998 | Michail et al. | |
| 5,974,557 A | 10/1999 | Thomas et al. | |
| 6,112,318 A | 8/2000 | Jouppi et al. | |
| 6,233,531 B1 | 5/2001 | Klassen et al. | |
| 6,275,782 B1 | 8/2001 | Mann | |
| 6,351,724 B1 | 2/2002 | Klassen et al. | |
| 6,546,359 B1 | 4/2003 | Week | |
| 6,678,777 B2 | 1/2004 | Rao et al. | |
| 6,792,392 B1 | 9/2004 | Knight | |
| 6,836,849 B2 * | 12/2004 | Brock et al. | 713/310 |
| 7,047,471 B2 | 5/2006 | Monfared et al. | |
| 7,051,221 B2 | 5/2006 | Clabes et al. | |
| 7,194,545 B2 | 3/2007 | Urien | |
| 7,194,645 B2 | 3/2007 | Bieswanger et al. | |
| 7,197,419 B2 * | 3/2007 | Floyd et al. | 702/130 |

(Continued)

OTHER PUBLICATIONS

U.S. Appl. No. 11/549,138, filed Oct. 13, 2006, Carpenter et al.

(Continued)

*Primary Examiner* — Thomas Lee
*Assistant Examiner* — Zahid Choudhury
(74) *Attorney, Agent, or Firm* — Stephen R. Tkacs; Stephen J. Walder, Jr.; Diana R. Gerhardt

(57) ABSTRACT

A mechanism is provided for unified management of power, performance, and thermals in computer systems. This mechanism incorporates elements to effectively address all aspects of managing computing systems in an integrated manner, instead of independently. The mechanism employs an infrastructure for real-time measurements feedback, an infrastructure for regulating system activity, component operating levels, and environmental control, a dedicated control structure for guaranteed response/preemptive action, and interaction and integration components. The mechanism provides interfaces for user-level interaction. The mechanism also employs methods to address power/thermal concerns at multiple timescales. In addition, the mechanism improves efficiency by adopting an integrated approach, rather than treating different aspects of the power/thermal problem as individual issues to be addressed in a piecemeal fashion.

20 Claims, 5 Drawing Sheets

U.S. PATENT DOCUMENTS

| | | | |
|---|---|---|---|
| 7,340,378 | B1 | 3/2008 | Floyd et al. |
| 7,382,366 | B1 | 6/2008 | Klock et al. |
| 7,475,175 | B2 * | 1/2009 | Klein et al. ............... 710/100 |
| 7,533,003 | B2 | 5/2009 | Floyd et al. |
| 7,681,054 | B2 | 3/2010 | Ghiasi et al. |
| 2002/0073255 | A1 | 6/2002 | Davidson et al. |
| 2004/0216113 | A1 | 10/2004 | Armstrong et al. |
| 2004/0236993 | A1 | 11/2004 | Adkisson et al. |
| 2004/0237003 | A1 | 11/2004 | Adkisson |
| 2005/0021292 | A1 | 1/2005 | Vock et al. |
| 2005/0081101 | A1 | 4/2005 | Love et al. |
| 2005/0102539 | A1 | 5/2005 | Hepner et al. |
| 2005/0108591 | A1 * | 5/2005 | Mendelson et al. ......... 713/500 |
| 2005/0155021 | A1 | 7/2005 | DeWitt, Jr. et al. |
| 2005/0177344 | A1 | 8/2005 | Khaleel |
| 2005/0183065 | A1 | 8/2005 | Wolczko et al. |
| 2005/0283677 | A1 | 12/2005 | Adkisson et al. |
| 2006/0179359 | A1 | 8/2006 | Floyd et al. |
| 2007/0001715 | A1 | 1/2007 | Brown et al. |
| 2007/0033425 | A1 * | 2/2007 | Clark ........................ 713/320 |
| 2007/0052453 | A1 * | 3/2007 | Wald ......................... 327/100 |
| 2007/0266263 | A1 * | 11/2007 | Lee et al. ................... 713/300 |
| 2007/0285080 | A1 * | 12/2007 | Abuhamdeh et al. ...... 324/76.54 |
| 2008/0065912 | A1 * | 3/2008 | Bodner et al. .............. 713/300 |
| 2008/0082844 | A1 | 4/2008 | Ghiasi et al. |
| 2008/0091962 | A1 * | 4/2008 | Cepulis et al. .............. 713/320 |
| 2008/0133180 | A1 | 6/2008 | Floyd et al. |
| 2008/0281476 | A1 * | 11/2008 | Bose et al. .................. 700/300 |
| 2008/0307238 | A1 * | 12/2008 | Bieswanger et al. ........ 713/300 |
| 2009/0187777 | A1 * | 7/2009 | Clark .......................... 713/320 |

OTHER PUBLICATIONS

U.S. Appl. No. 11/539,225, filed Oct. 6, 2006, Brenner et al.

Chase, et al., "Identifying Deterministic Performance Boost Capability of a Computer System", USPTO U.S. Appl. No. 12/274,534, Image File Wrapper printed from PAIR Aug. 30, 2010, 1 page.

Ghiasi, Soraya et al., "Scheduling for Heterogeneous Processors in Server Systems", RC23488 (W0501-036) Computer Science, IBM Search Report, IBM Research Division, Jan. 11, 2005, 19 pages.

Kotla, Ramakrishna et al., "Characterizing the Impact of Different Memory-Intensity Levels", IEEE 7th Annual Workshop on Workload Characterization, Oct. 2004, 8 pages.

Kotla, Ramakrishna et al., "Scheduling Processor Voltage and Frequency in Server and Cluster Systems", RC23425 Revised (W0507-140) Computer Science, IBM Research Report, Jul. 19, 2005, 14 pages.

May, John M., "MPX: Software for Multiplexing Hardware Performance Counters in Multithreaded Programs", IPDPS Proceedings, 2001, 9 pages.

Zhu, Yongkang et al., "Localized Microarchitecture-Level Voltage Management", IEEE International Symposium on Circuits and Systems, May 21-24, 2006, pp. 37-40.

* cited by examiner

UNIFIED MANAGEMENT OF POWER, PERFORMANCE, AND THERMALS IN COMPUTER SYSTEMS

BACKGROUND

1. Technical Field

The present application relates generally to an improved data processing system and method. More specifically, the present application is directed to a system for unified management of power, performance, and thermals in computer systems.

2. Description of Related Art

Power and thermal issues have joined performance concerns to dictate design and management of computer systems. Increasing circuit density in semiconductor chips and component densities in computing systems, coupled with increase in operational frequencies, have considerably increased component and system power consumption and local power and heat densities in systems.

Increasing circuit densities are realized by decreasing transistor dimensions. This, however, causes increased variability in transistor features and decreased predictability in the realized semiconductor chips, including their power consumption and reliability characteristics.

Increasing power densities cause increased power dissipation. However, computer component and system cooling solutions have not kept pace in a cost-effective manner. The increasing mismatch between power dissipation and heat removal raises operating temperatures, which can cause intermittent and permanent circuit and component failures.

With increased component variability, wider margins are required in power distribution systems to accommodate the wider ranges of power consumption by the components. Coupled with an increase in supply requirements, this implies increased loss from inefficiencies in the power system.

To decrease power consumption, component and circuit designers employ a wide variety of techniques, such as clock-gating, power gating, etc., which cause power consumption to track activity. Thus, consumption now varies also with activity or usage. This increases the variability in consumption and consequently somewhat exacerbates the problem of predicting consumption and designing power supply and delivery systems to match anticipated consumption requirements.

Increasing component/system power consumption also requires increasing cooling requirements, which also leads to increased energy consumption. This has reached an extent that data centers find it difficult to replace their existing systems with new machines without a major overhaul and/or redesign of their facilities.

System management solutions have to avoid failures due to thermal and power supply/distribution issues. Unpredictability in requirements leads to considerable over-provisioning in cooling and supply solutions to avoid failures. However, this is not cost-effective. Consequently, most modern systems employ some form of emergency actuations to kick in when their statically determined margins prove inadequate. Both static margins and emergency actuations are sources of constrained performance that may prevent the system from realizing peak performance efficiencies. But, to ensure safe operation, systems designers routinely trade off system performance, employing static margins, emergency actuations, or both.

The industry is awash with a number of solutions to address different aspects of the power/thermal problems facing computer systems. A common oversight in currently proposed solutions is in that they target only a subset of the problems, and do not take a comprehensive approach. On-chip thermal emergency throttling solutions inherent in many current microprocessor chips are designed to address only thermal problems detected as temperature sensor overdrive on chip.

Demand-based switching or load-aware energy saving solutions detect when the application load on the processor is very low and adopt lower power/more energy-efficient, but lower performance, operating points in such situations. These solutions address the need for saving energy, but are not reliable for safe operation under process-induced, environmental or workload-induced variability.

Some microcontrollers employ on-chip ammeters and temperature sensors to detect chip-level thermal and power supply problems. These solutions react to any indication of either problem by employing a dynamic voltage and frequency scaling mechanism to lower chip operating point reducing or even eliminating chip-level failures from power/thermal overdrive. Alternatively, these solutions can be viewed as a solution to extract high performance, by boosting frequency, when there is sufficient room with respect to on-chip power/thermal constraints. While appropriate for reliable operation and increased performance at the microprocessor level, these solutions must be coupled with other solutions for providing the same benefits at the system level and for energy savings even at the chip level.

In effect, existing solutions address only part of the fallouts created by power and thermal issues.

SUMMARY

The illustrative embodiments described herein recognize the disadvantages of the prior art and provide a system for unified management of power, performance, and thermals in computer systems. This system incorporates elements to effectively address all aspects of managing computing systems in an integrated manner, instead of independently. The system employs an infrastructure for real-time measurements feedback, an infrastructure for regulating system activity, component operating levels, and environmental control, a dedicated control structure for guaranteed response/preemptive action, and interaction and integration components. The system provides interfaces for user-level interaction. The system also employs methods to address power/thermal concerns at multiple timescales. In addition, the system improves efficiency by adopting an integrated approach, rather than treating different aspects of the power/thermal problem as individual issues to be addressed in a piecemeal fashion.

In one illustrative embodiment, a method for unified management of power, performance, and thermals in a computer system comprises initializing a power management controller in a thermal power management device card in the computer system. The method further comprises receiving, by the power management controller, power input data about power from detection circuits that measure power drawn from a bulk power supply in the computer system. The method further comprises receiving, by the power management controller, thermal input data about thermals from at least one temperature sensor in the computer system. The method further comprises receiving, by the power management controller, first performance input data about performance from at least one monitor on at least one processor in the computer system. The method further comprises receiving, by the power management controller, second performance input data about performance from in-band software running on the at least one processor. The method further comprises generating, by the power management controller, actuation commands based on the power input data, the thermal input data, the first performance input data, and the second performance input data. The actuation commands comprise a clock signal to serve as a clock input for the at least one processor and at least one voltage control to serve as an input for at least one voltage regulator module that receives power from the bulk power supply and supplies power to the at least one processor.

In one exemplary embodiment, the power management controller comprises out-of-band software running on a processor of the computer system. In another exemplary embodiment, the power management controller comprises a dedicated power management processor. In yet another exemplary embodiment, receiving input data comprises receiving input data from sensors. In a further exemplary embodiment, the input data comprise at least one of power measurements, temperature measurements, performance/micro-architectural event rate measurements, or critical sensor measurements for operational stability.

In still another exemplary embodiment, the input data comprise chip-level, sub-chip-level, sub-system-level, and full-system-level measurements. In a further exemplary embodiment, the actuation commands comprise at least one of voltage control, frequency control, processor instruction throttling, memory system request rate throttling, memory power-mode control, or fan speed control.

In another exemplary embodiment, the power management controller generates actuation commands based on user-directed policies and operation modes. In a further exemplary embodiment, the user-directed policies dictate a potential trade-off point between performance and power consumption.

In yet another exemplary embodiment, the method further comprises providing user-level interaction output. In a further exemplary embodiment, the user-level interaction output comprises at least one of optimization preference/operating modes, user-level constraints, power/thermal events, or usage status feedback to the user.

In one exemplary embodiment, the method further comprises exporting system-level operating control specification to a higher level management infrastructure. In another exemplary embodiment, the method further comprises providing fine-grain local event and usage information.

In another illustrative embodiment, a computer system comprises at least one processor, a bulk power supply, at least one voltage regulator module that receives power from the bulk power supply and supplies power to the at least one processor, and a thermal power management device card comprising a power management controller. The power management controller receives power input data about power from detection circuits that measure power drawn from the bilk power supply. The power management controller receives thermal input data about thermals from at least one temperature sensor in the computer system. The power management controller receives first performance input data about performance from at least one monitor on the at least one processor. The power management controller receives second performance input data about performance from in-band software running on the at least one processor. The power management controller generates actuation commands based on the power input data, the thermal input data, the first performance input data, and the second performance input data. The actuation commands comprise a clock signal to serve as a clock input for the at least one processor and at least one voltage control to serves an input for at least one voltage regulator module that receives power from the bulk power supply and supplies power to the at least one processor.

In one exemplary embodiment, the power management controller comprises out-of-band software running on a processor of the computer system. In another exemplary embodiment, the power management controller comprises a dedicated power management processor. In yet another exemplary embodiment, the input data comprise at least one of power measurements, temperature measurements, performance/micro-architectural event rate measurements, or critical sensor measurements for operational stability.

In a further exemplary embodiment, the input data comprise chip-level, sub-chip-level, sub-system-level, and full-system-level measurements. In a still further exemplary embodiment, the actuation commands comprise at least one of voltage control, frequency control, processor instruction throttling, memory system request rate throttling, memory power-mode control, or fan speed control.

In yet another illustrative embodiment, a computer program product comprises a computer useable medium having a computer readable program. The computer readable program, when executed on a computing device, causes the computing device to initialize a power management controller in a thermal power management device card in the computer system. The computer readable program further causes the computing device to receive, by the power management controller, power input data about power from detection circuits that measure power drawn from a bulk power supply in the computer system. The computer readable program further causes the computing device to receive, by the power management controller, thermal input data about thermals from at least one temperature sensor in the computer system. The computer readable program further causes the computing device to receive, by the power management controller, first performance input data about performance from at least one monitor on at least one processor in the computer system. The computer readable program further causes the computing device to receive, by the power management controller, second performance input data about performance from in-band software in on the at least one processor. The computer readable program further causes the computing device to generate, by the power management controller, actuation commands based on the power input data, the thermal input data, the first performance input data, and the second performance input data. The actuation commands comprise a clock signal to serve as a clock input for the at least one processor and at least one voltage control to serve as an input for at least one voltage regulator module that receives power from the bulk power supply and supplies power to the at least one processor.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE ILLUSTRATIVE EMBODIMENTS

Figure 1:
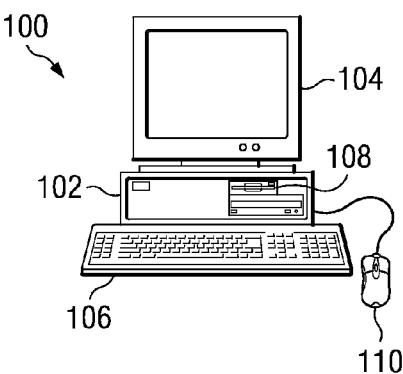
FIG. 1 is a pictorial representation of a data processing system in which the present invention may be implemented in accordance with an illustrative embodiment.
Figure 2:
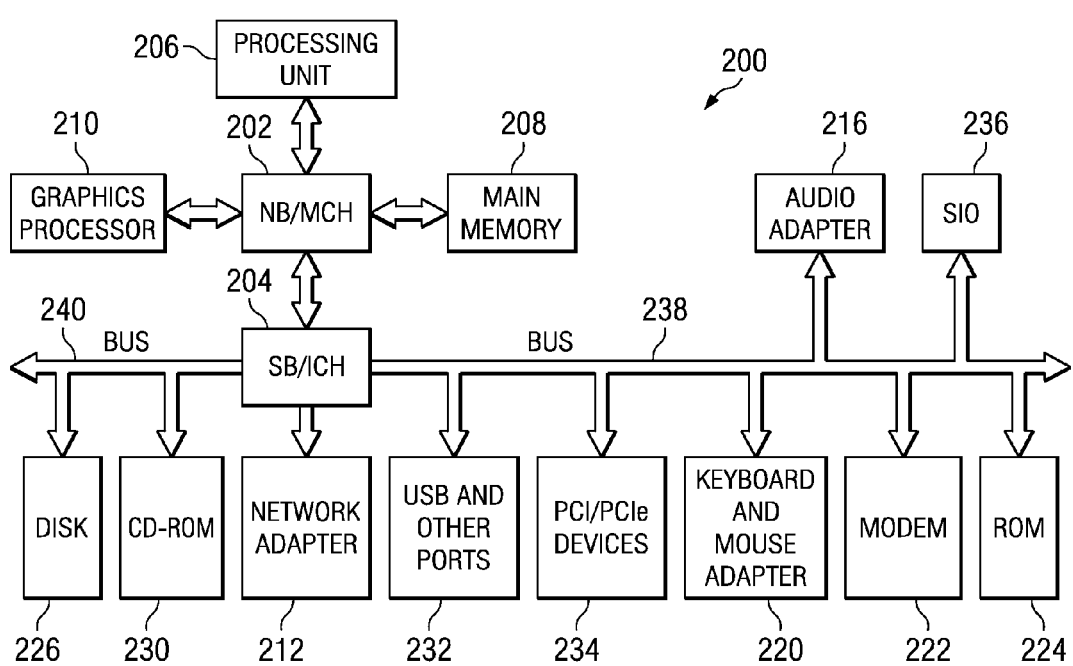
FIG. 2 is a block diagram of an exemplary data processing system in which aspects of the illustrative embodiments may be implemented.

With reference now to the figures and in particular with reference to FIGS. 1-2, exemplary diagrams of data processing environments are provided in which illustrative embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

FIG. 1 is a pictorial representation of a data processing system in which the present invention may be implemented in accordance with an illustrative embodiment. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like.

Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

With reference now to FIG. 2, a block diagram of an exemplary data processing system is shown in which aspects of the illustrative embodiments may be implemented. Data processing system 200 is an example of a computer, such as computer 100 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). Alternatively, a virtual environment manager may run on the processing units, supporting one or more operating system environments on them.

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

In accordance with the illustrative embodiments described herein, a system for unified management of power, performance, and thermals is provided in computer systems, such as, for example, computer 100 in FIG. 1 or data processing system 200. The system incorporates elements to effectively address power consumption, heat densities, and performance in an integrated manner instead of independently. The system employs an infrastructure for real-time measurement feedback. These measurements include power measurements, temperature measurements, performance/micro-architectural event rate measurements, and critical sensor measurements for operational stability. To address the different sources of variability and unpredictability, including the manufacturing process, environment (thermal), and workload, the system employs real-time measurements feedback of all relevant quantities. Measurements may include chip-level (e.g., power at the voltage regulator module), sub-chip-level (e.g., multiple digital sensors on chip, multiple voltage rails on chip), sub-system-level (e.g., disk or memory system power), and full-system-level measurements (e.g., total box direct current power).

The system also employs an infrastructure for regulating system activity, component operating levels, and environmental control. This infrastructure may include processor pipeline throttling modes, voltage and frequency scaling, processor stand-by modes, memory controller low-power modes, memory request throttling, disk low-power modes, fan/blower speeds, cooling pump controls, etc.

Furthermore, the system may employ a dedicated control structure for guaranteed response/pre-emptive action to ensure reliable and continued operation, with mechanisms for necessary interactions with in-band software structure, such as operating systems, hypervisors, and applications. Within the context of this disclosure, "out-of-band" is defined to mean executing outside the purview of the system microprocessor(s), in contrast to "in band," which is within the execution purview of the system microprocessor(s), either as a thread executing in real-time or as basic input output system (BIOS) code executed at system startup. Purely in-band solutions, such as control code that executes on the same resources as it manages, can often fail to provide response/reaction/preemptive action for power/thermal emergencies in a required guaranteed maximum time. Furthermore, superior response time with out-of-band control reduces operational margins in power and performance potentially leading to higher efficiencies, performance, and/or superior energy savings. Because of its fast reaction times, out-of-band control can operate closer to the thresholds as it does not have to provide for a longer reaction time to change in circumstances that can cause it to exceed threshold before it can react. However, in-band solutions potentially have the advantage of superior knowledge of system usage by the operating systems/applications.

Thus, in one illustrative embodiment, the system employs a dedicated out-of-band control infrastructure for guaranteed response times with specific mechanisms to make available system usage information to the control infrastructure. Conversely, the in-band infrastructure obtains information from the dedicated out-of-band control infrastructure to further optimize for power management goals and also better guide its other system management tasks. Thus, the system obtains both the superior control characteristics of an out-of-band infrastructure while exploiting better system usage information available in the in-band software infrastructure. A key to successful realization of the system in the illustrative embodiments is information availability/communications within the control infrastructure.

In environments where dedicated out-of-band control is difficult to realize, the system may be implemented with careful design of in-band methods to obtain much of the benefits. And, conversely, when communications with the in-band infrastructure is minimal or non-existent, out-of-band control can still realize much of the benefits from careful design. However, a superior solution is always obtainable with better integration or communications between out-of-band and in-band control.

Still further, the system may employ interaction and integration components for policy-based management accepting user-directed policies and operation modes, providing crucial event and comprehensive usage information, and integration into larger-scope system management frameworks. A key aspect of the system in the embodiments described herein, which is often overlooked by other solutions, is adequate and appropriate user-level interactions. For example, the user/administrator may have the ability to dictate whether workload performance or energy considerations are the dominant concern, or may choose a potential trade-off point between performance and power consumption. This is in contrast to dictating what specific frequency the system is to use to meet a real goal.

The system in the illustrative embodiments provides appropriate interfaces for user-level interaction—optimization preference/operating modes, user-level constraints, power/thermal events, and usage status feedback to the user. Additionally, the system is designed to be capable of integration into a larger systems management framework by exporting its system-level operating control specification to a higher level management infrastructure and by providing fine-grain local event and usage information.

In taking an approach to provide a comprehensive solution, the system also employs methods to address power/thermal concerns at multiple timescales. For example, voltage droops at the chip level might be addressed in the nanosecond timescale with on-chip reaction/correction capabilities, while thermal considerations at the package level can potentially be addressed even at the millisecond timescale. Some policy changes can operate at the seconds timescale without compromising reliability or effectiveness.

Figure 3:
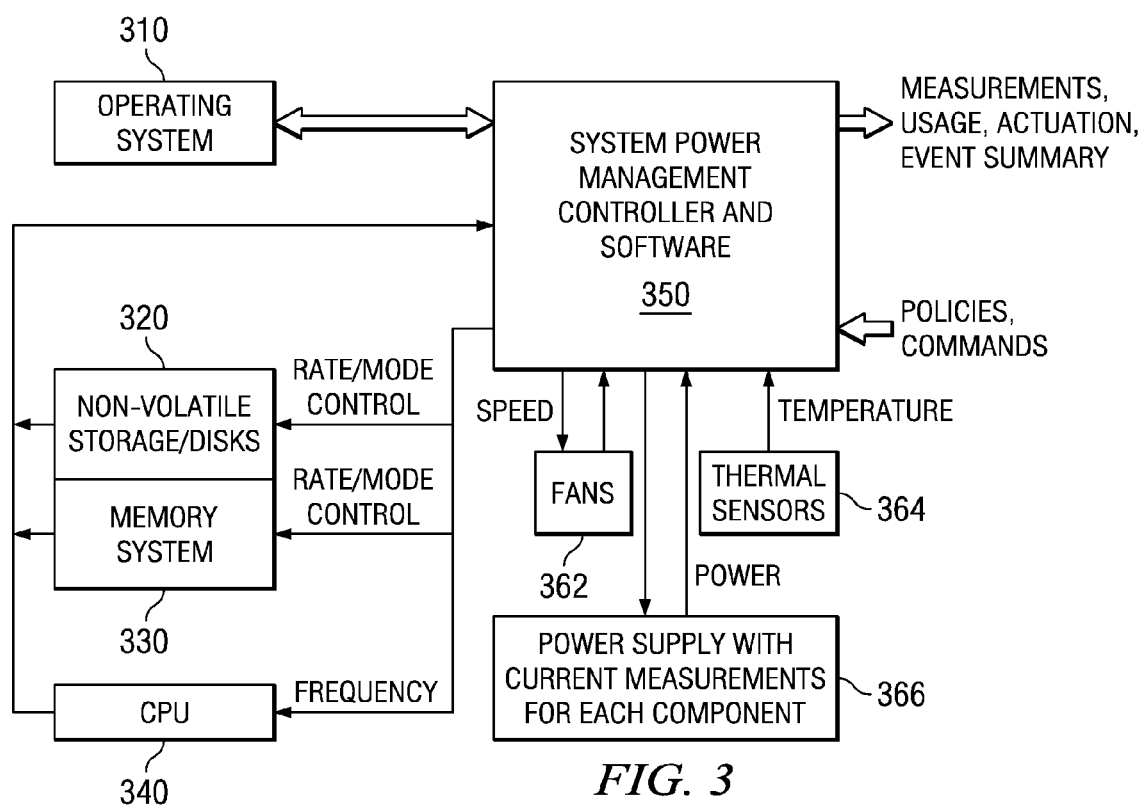
FIG. 3 is a block diagram illustrating a unified system for management of power, performance, and thermals in a computer system in accordance with an illustrative embodiment.

FIG. 3 is a block diagram illustrating a unified system for management of power, performance, and thermals in a computer system in accordance with an illustrative embodiment. The system comprises real-time measurements feedback of component and system power consumption from the power supply 366, temperature measurements from distributed thermal sensors 364 within the system, performance and activity measurements from the central processing unit (CPU) 340, memory subsystem 330, and storage subsystem 320, and stable operation indicators from CPU 340. The system also comprises actuators for regulating power consumption/dissipation—frequency of CPU 340 and its voltage (at the power supply), rate and mode control for memory system 330 and storage subsystems 320, and a controlling environment for fans 362, for example.

System power management controller and software 350 receives all sensor input from thermal sensors 364, power supply 366, fans 362, CPU 340, memory system 330, and storage subsystem 320. Software running on system power management controller 350 runs control algorithms to generate actuation commands to storage subsystem 320, memory system 330, CPU 340, fans 362, and power supply 366.

System power management controller 350 interacts with the in-band software in the form of operating system 310, obtaining application and system usage requirements and providing, in return, component state information for better scheduling.

Interaction and integration components are built into power management controller 350 to receive commands and policy information from user/larger-scope management control. These interaction and integration components may also send measurements, usage, and actuation information of the managed system for analysis, planning, and additional adaptations.

Figure 4A:
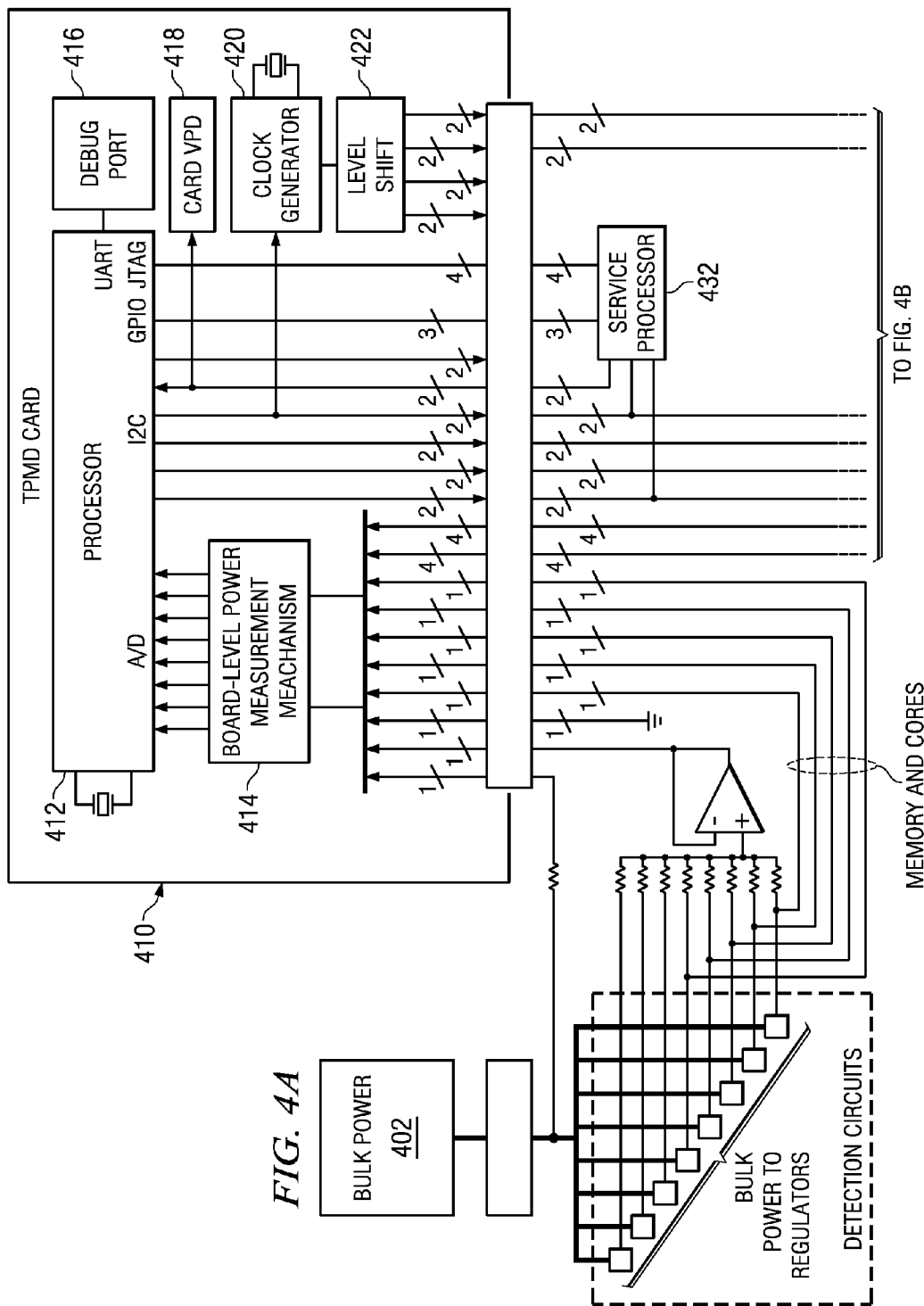
FIGS. 4A and 4B illustrate an example implementation for a computing system for a unified system for management of power, performance, and thermals in accordance with an illustrative embodiment.
Figure 4B:
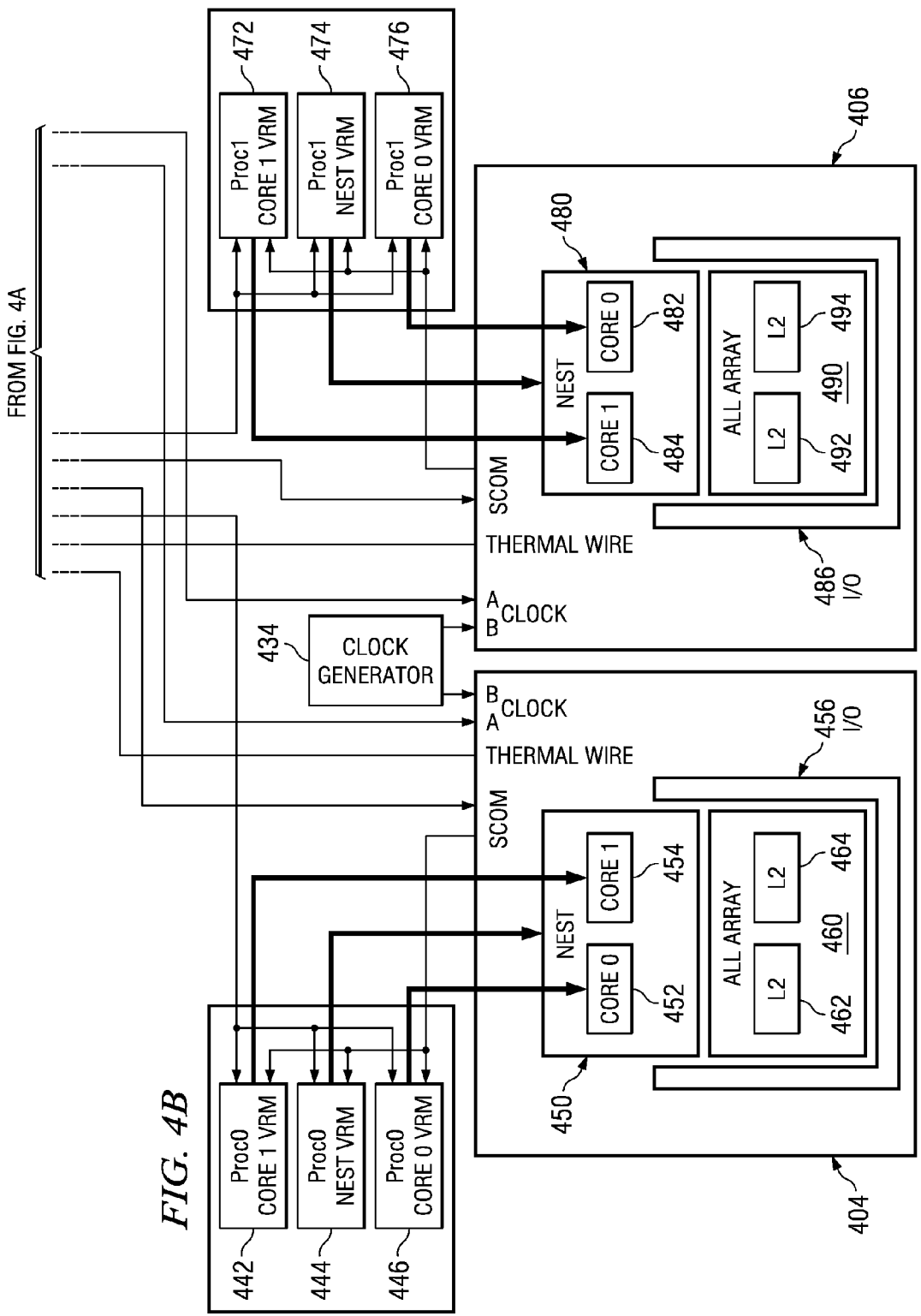

FIGS. 4A and 4B illustrate an example implementation for a computing system for a unified system for management of power, performance, and thermals in accordance with an illustrative embodiment. The computer system is a two-processor system including processor 404 and processor 406. Processor 404 includes nest 450 with two cores, core 0 452 and core 1 454. Processor 404 also includes all array 460 with L2 cache 462, 464, and input/output (I/O) 456. Processor 406 includes nest 480 with two cores, core 0 482 and core 1 484. Processor 406 also includes all array 490 with L2 cache 492, 494, and I/O 486.

Power to processor chips 404, 406 comes from independent voltage regulator modules (VRMs) for each voltage domain in the processor chips, which obtain their input power from bulk power supply 402 for the entire system. Processor 0 core 1 VRM 442 supplies power to core 1 454, processor 0 nest VRM 444 supplies power to nest 450, and processor 0 core 0 VRM 446 supplies power to core 0 452 of processor 0 404. Similarly, processor 1 core 1 VRM 472 supplies power to core 1 484, processor 1 nest VRM 474 supplies power to nest 480, and processor 1 core 0 VRM 476 supplies power to core 0 482 of processor 1 406.

Clock generator 434 provides a clock source to processors 404, 406 for conventional operation. Processors 404, 406 contain built-in memory controllers (not shown) for off-chip DRAM access. I/O 456, 486 show a separate voltage domain for I/O and analog circuits. The memory controllers are not explicitly shown as commands to them are sent to the chip the same way as commands to throttle cores through the I2C-SCOM setup. Service processor 432 runs conventional service processor firmware for providing service facilities.

In accordance with the illustrative embodiment, thermal power management device (TPMD) card 410 is a dedicated power management controller card. TPMD card 410 includes TPMD processor 412 running the control software in a real-time operating environment. TPMD card 410 may be an expansion card, which is added to the computer system through an on-board connector.

TPMD card 410 includes board-level power measurement mechanism 414, which includes real-time power measurement circuitry to monitor the power drawn on the different voltage rails from bulk power supply 402. Board-level power measurement mechanism 414 also filters and performs analog-to-digital (A/D) conversion, feeding the A/D channels of TPMD processor 412. TPMD card 410 also includes programmable clock generator 420, which can feed processors 404 and 406 as an alternative to clock generator 434, regulated by the thermal power management controller 412.

TPMD card 410 also includes communication/control channels to the VRMs 442-446 and 472-476 to adjust the voltages delivered to the processor voltage domains and to access power delivery information. The communication channel between service processor 432 and TPMD card 410 provides an integration and interface component for the management of power, performance, and thermals. The communication channel to the processor through an inter-integrated circuit (I2C) interface provides access to on-chip sensors and actuators. I2C is a two-wire serial communication protocol.

Some key elements on the processor chips 404, 406, which are not explicitly shown for simplicity, are activity/performance monitors on the processors, temperature sensors on the processors, operational stability indicators on the processors, processor and memory controller throttling controls, and registers and "mailboxes" for communication with in-band software. All these elements are accessible on the processors' on-chip clocked serial communications network, labeled scan communications (SCOM), which is, in turn, accessible by TMPD card 410 via its I2C channel.

The computer system shown in FIGS. 4A and 4B may function in the following manner. Service processor 432 handles system startup and initialization. In addition to processor initialization, for thermal power management, service processor 432 also handles initialization of power management processor 412 through the joint test action group (JTAG) interface. Service processor 432 obtains information about TMPD card 410 from card vital product data (VPD) 418.

Once initialized, TPMD processor 412 takes over the power regulation tasks. Hard constraints of power and thermal considerations, initial characteristics of actuation control, such as voltage-frequency relationships of the processors' domains, individual chip characteristics, and start-up power management policy are part of the initialization information. Given this information, TPMD processor 412 executes code to periodically monitor all sensors in the system, including various power measurements, temperature measurements, activity measurements, and system stability indicators, for example. Feedback control algorithms run by TPMD processor 412 dictate the choice of which actuator to use and to what extent based on the sensor inputs; power and thermal constraints; and, power management policy. Actuations include voltage (through the VRMs 442-446 and 472-476) and frequency control (through programmable clock generator 420, processor instruction and throttling, memory system request rate throttling, and memory power-mode control.

Clock generator 420 connects to level shift 422, which is used to convert the clock signal to the right voltage level for transmission and to serve as clock input to processor chips 404, 406. The I2C interface is used by the TPMD to communicate with VRMs 442-446, 472-476 and clock generator 420 independently. Service processor 432 is also on the I2C interface to the VRMs to control them for systems without the TPMD card.

Regular summaries of system usage (power, activity, actuation, temperature) and power/thermal events (e.g., crossing thresholds, emergency actuations) are communicated to service processor 432 and, through it, to higher-level management entities. Policy information flows through service processor 432 to power management processor 412. Additional communications handled by processor 412 include those with in-band software through registers and mailboxes implemented in the processor hardware for this purpose, and servicing commands on debug port 416.

Figure 5:
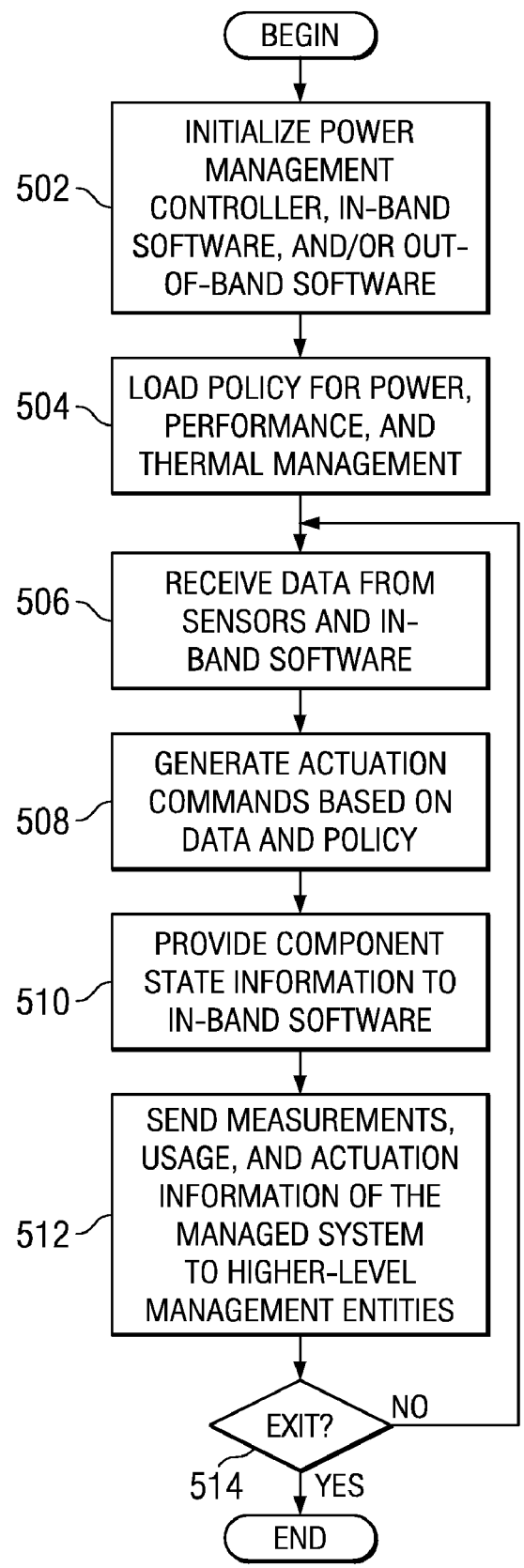
FIG. 5 is a flowchart illustrating operation of a unified system for management of power, performance, and thermals in a computer system in accordance with an illustrative embodiment.

FIG. 5 is a flowchart illustrating operation of a unified system for management of power, performance, and thermals in a computer system in accordance with an illustrative embodiment. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

Furthermore, the flowchart is provided to demonstrate the operations performed within the illustrative embodiments. The flowchart is not meant to state or imply limitations with regard to the specific operations or, more particularly, the order of the operations. The operations of the flowchart may be modified to suit a particular implementation without departing from the spirit and scope of the present invention.

With reference now to FIG. 5, operation begins and the system initializes the power management controller, in-band software, and/or out-of-band software (block 502). A service processor, for example, may initialize the power management controller. The unified system for management of power, performance, and thermals may employ a purely in-band software infrastructure, a purely out-of-band infrastructure, or a combination of in-band and out-of-band infrastructure.

Then, the power management controller loads a user policy for power, performance, and thermal management (block 504). Thus, the power management controller accepts user-directed policies and operation modes, providing crucial event and comprehensive usage information, and integration into larger-scope system management frameworks. Note that this interaction can be commenced/resumed dynamically at any point during runtime. The system may provide appropriate interfaces for user-level interaction—optimization preference/operating modes, user-level constraints, power/thermal events, and usage status feedback to the user.

Next, the power management controller receives input data from sensors and in-band software (block 506). These measurements may include power measurements, temperature measurements, performance/micro-architectural event rate measurements, and critical sensor measurements for operational stability. To address the different sources of variability and unpredictability, including the manufacturing process, environment (thermal), and workload, the system employs real-time measurements feedback of all relevant quantities. Measurements may include chip-level (e.g., power at the voltage regulator module), sub-chip-level (e.g., multiple digital sensors on chip, multiple voltage rails on chip), sub-system-level (e.g., disk or memory system power), and full-system-level measurements (e.g., total box direct current power).

The system may also employ an infrastructure for regulating system activity, component operating levels, and environmental control. This infrastructure may include processor pipeline throttling modes, voltage and frequency scaling, processor stand-by modes, memory controller low-power modes, memory request throttling, disk low-power modes, fan/blower speeds, etc. Therefore, the power management controller generates actuation commands based on the input data and the user policy (block 508).

The power management controller provides component state information, thermal information and optional commands/requests, e.g., to not allocate tasks on a certain core, to in-band software (block 510). Thus, the in-band infrastructure may obtain information from the dedicated out-of-band control infrastructure to further optimize for power management goals and also better guide its other system management tasks.

The system is designed to be capable of integration into a larger systems management framework by exporting its system-level operating control specification to a higher level management infrastructure and by providing fine-grain local event and usage information. Therefore, the power management controller sends measurements, usage, and actuation information of the managed system to higher-level management entities (block 512).

The power management controller determines whether an exit condition exists (block 514). An exit condition may exist, for example, when the managed system shuts down or becomes inactive. If an exit condition does not exist, operation returns to block 506 to receive input data from sensors and in-band software. If an exit condition exists in block 514, operation ends.

Thus, the illustrative embodiments solve the disadvantages of the prior art by providing a unified approach to face the problems caused by power and thermal issues addressing safe, reliable, continuous operation, performance optimization within constraints, energy savings, adaptability to changing user requirements supporting policy-guided power management, access to critical power/thermal event and usage information, and integration into larger-scope system management frameworks. The system provides superior efficiencies by adopting an integrated approach, rather than treating different aspects of the power/thermal problem as individual issues to be addressed in a piecemeal fashion. By taking an integrated approach, the system provides not only a wider scope solution, but also a more effective solution.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for unified management of power, performance, and thermals in a computer system, the method comprising:
    initializing a power management controller in a thermal power management device card in the computer system;
    receiving, by the power management controller, power input data about power from detection circuits that measure power drawn from a bulk power supply in the computer system;
    receiving, by the power management controller, thermal input data about thermals from at least one temperature sensor in the computer system;
    receiving, by the power management controller, first performance input data about performance from at least one monitor on at least one processor in the computer system;
    receiving, by the power management controller, second performance input data about performance from in-band software running on the at least one processor; and
    generating, the power management controller, actuation commands based on the power input data, the thermal input data, the first performance input data, and the second performance input data, wherein the actuation commands comprise a clock signal to serve as a clock input for the at least one processor and at least one voltage control to serve as an input for at least one voltage regulator module that receives power from the bulk power supply and supplies power to the at least one processor.

2. The method of claim 1, further comprising:
    communicating, by the power management controller, a summary of system usage and power/thermal events to a service processor in the computer system.

3. The method of claim 1, wherein receiving thermal input data comprises receiving the thermal input data from at least one temperature sensor on the at least one processor.

4. The method of claim 1, wherein receiving the second performance input data comprises receiving input data from a mailbox for communicating with the in-band software.

5. The method of claim 1, wherein the first performance input data comprise at least one of micro-architectural event rate measurements or critical sensor measurements for operational stability.

6. The method of claim 1, wherein the actuation commands further comprise actuation commands for one or more fans.

7. The method of claim 1, wherein the actuation commands further comprise at least one of processor instruction throttling, memory system request rate throttling, memory power-mode control, or fan speed control.

8. The method of claim 1, wherein the power management controller generates actuation commands based on user-directed policies and operation modes.

9. The method of claim 8, wherein the user-directed policies dictate a potential trade-off point between performance and power consumption.

10. The method of claim 1, further comprising:
    providing user-level interaction output.

11. The method of claim 10, wherein the user-level interaction output comprises at least one of optimization preference/operating modes, user-level constraints, power/thermal events, or usage status feedback to the user.

12. The method of claim 1, further comprising:
    exporting system-level operating control specification to a higher level management infrastructure.

13. The method of claim 1, wherein the at least one processor comprises a plurality of processors.

14. A computer system comprising:
    at least one processor;
    a bulk power supply;
    at least one voltage regulator module that receives power from the bulk power supply and supplies power to the at least one processor; and
    a thermal power management device card comprising a power management controller,
    wherein the power management controller receives power input data about power from detection circuits that measure power drawn from the bulk power supply;
    wherein the power management controller receives thermal input data about thermals from at least one temperature sensor in the computer system;
    wherein the power management controller receives first performance input data about performance from at least one monitor on the at least one processor;
    wherein the power management controller receives second performance input data about performance from in-band software running on the at least one processor; and
    wherein the power management controller generates actuation commands based on the power input data, the thermal input data, the first performance input data, and the second performance input data, wherein the actuation commands comprise a clock signal to serve as a clock input for the at least one processor and at least one voltage control to serve as an input for at least one voltage regulator module that receives power from the bulk power supply and supplies power to the at least one processor.

15. The system of claim 14, wherein the power management controller communicates a summary of system usage and power/thermal events to a service processor in the computer system.

16. The system of claim 14, wherein the power management controller receives the thermal input data from at least one temperature sensor on the at least one processor.

17. The system of claim 14, wherein the first performance input data comprise at least one of micro-architectural event rate measurements or critical sensor measurements for operational stability.

18. The system of claim 14, wherein the power management controller generates actuation commands based on user-directed policies and operation modes.

19. The system of claim 14, wherein the actuation commands further comprise at least one of processor instruction throttling, memory system request rate throttling, memory power-mode control, or fan speed control.

20. A computer program product comprising a non-transitory computer useable medium having a computer readable program, wherein the computer readable program, when executed on a computing device, causes the computing device to:

initialize a power management controller in a thermal power management device card in the computer system;

receive, by the power management controller, power input data about power from detection circuits that measure power drawn from a bulk power supply in the computer system;

receive, by the power management controller, thermal input data about thermals from at least one temperature sensor in the computer system;

receive, by the power management controller, first performance input data about performance from at least one monitor on at least one processor in the computer system;

receive, by the power management controller, second performance input data about performance from in-band software running on the at least one processor; and generate, by the power management controller, actuation commands based on the power input data, the thermal input data, the first performance input data, and the second performance input data, wherein the actuation commands comprise a clock signal to serve as a clock input for the at least one processor and at least one voltage control to serve as an input for at least one voltage regulator module that receives power from the bulk power supply and supplies power to the at least one processor.

\* \* \* \* \*